(12) United States Patent
Diao et al.

(10) Patent No.: US 8,375,252 B2
(45) Date of Patent: Feb. 12, 2013

(54) METHOD, DEVICE AND SYSTEM FOR AUTOMATIC DEVICE FAILURE RECOVERY

(75) Inventors: Meng Diao, Guangdong (CN); Lei Li, Guangdong (CN); Bo Yang, Guangdong (CN); Zhiyong Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 11/957,547

(22) Filed: Dec. 17, 2007

(65) Prior Publication Data
US 2008/0104442 A1 May 1, 2008

Related U.S. Application Data

(63) Continuation of application No. PCT/CN2006/001220, filed on Jun. 6, 2006.

(30) Foreign Application Priority Data

Jun. 15, 2005 (CN) .......................... 2005 1 0078421
Jun. 30, 2005 (CN) .......................... 2005 1 0080177

(51) Int. Cl.
*G06F 11/00* (2006.01)

(52) U.S. Cl. ....................................................... 714/36

(58) Field of Classification Search ...................... 714/36
See application file for complete search history.

(56) References Cited

U.S. PATENT DOCUMENTS

| 5,307,354 | A | 4/1994 | Cramer et al. | |
|---|---|---|---|---|
| 5,623,604 | A * | 4/1997 | Russell et al. | 717/167 |
| 6,314,532 | B1 | 11/2001 | Daudelin et al. | |
| 6,952,758 | B2 * | 10/2005 | Chron et al. | 711/162 |
| 7,047,448 | B2 * | 5/2006 | Rao et al. | 714/38 |
| 7,373,551 | B2 * | 5/2008 | Rothman et al. | 714/30 |
| 7,609,575 | B2 * | 10/2009 | Hays | 365/215 |
| 7,640,458 | B2 * | 12/2009 | Rao et al. | 714/38 |
| 2004/0153703 | A1 | 8/2004 | Vigue et al. | |
| 2005/0028165 | A1 | 2/2005 | McGowan et al. | |
| 2005/0091288 | A1 * | 4/2005 | Ji et al. | 707/200 |
| 2005/0132351 | A1 * | 6/2005 | Randall et al. | 717/168 |
| 2006/0268897 | A1 | 11/2006 | Qiao et al. | |
| 2008/0104442 | A1 * | 5/2008 | Diao et al. | 714/3 |
| 2010/0248707 | A1 * | 9/2010 | Hoffner et al. | 455/419 |

FOREIGN PATENT DOCUMENTS

| CN | 1470985 A | 1/2004 |
|---|---|---|
| CN | 1581074 A | 2/2005 |
| EP | 0 899 663 A1 | 3/1999 |
| JP | 2004-042304 A | 2/2004 |

(Continued)

OTHER PUBLICATIONS

"CPE WAN Management Protocol", DSLHome-Technical Working Group, DSL Forum TR-069, May 2004, 109 pages.

(Continued)

*Primary Examiner* — Amine Riad (57) ABSTRACT

Embodiments of the present invention provide a method, devices and a system for automatic device failure recovery. The method mainly includes: sending a recovery request message to a management device or a server; obtaining a program file used for failure recovery from the management device or the server; and performing the failure recovery by using the program file. With the implemention of the present invention, a device may recover from a failure fully automatically. No intervention of a local user is needed in the whole failure recovery process. Therefore, the implementation of the recovery is more convenient and more flexible. Meanwhile, the failure emergency recovery of the device may be implemented automatically, which makes the failure recovery processing safer and more reliable, and effectively reduces the cost of the local maintenance of a device.

4 Claims, 6 Drawing Sheets

FOREIGN PATENT DOCUMENTS

| WO | 00/10085 A1 | 2/2000 |
|---|---|---|
| WO | WO 2004/001589 A2 | 12/2003 |
| WO | WO 2004/044702 A2 | 5/2004 |
| WO | 2005/039161 A1 | 4/2005 |

OTHER PUBLICATIONS

Partial Translation of Office Action dated Aug. 24, 2007 in connection with Chinese Patent Application No. 200510080688.X.

Partial Translation of Office Action dated Nov. 23, 2007 in connection with Chinese Patent Application No. 200510080688.X.

Partial Translation of Rejection Decision dated Jul. 4, 2008 in connection with Chinese Patent Application No. 200510080688.X.

Written Opinion of the International Searching Authority dated Sep. 21, 2006 in connection with International Patent Application No. PCT/CN2006/001220.

Communication pursuant to Article 94(3) EPC dated May 27, 2010 in connection with European Patent Application No. 06 742 106.5.

Communication pursuant to Article 94(3) EPC dated May 29, 2009 in connection with European Patent Application No. 06 742 106.5.

\* cited by examiner

METHOD, DEVICE AND SYSTEM FOR AUTOMATIC DEVICE FAILURE RECOVERY

FIELD OF THE INVENTION

The present invention relates to network communication technologies, and particularly, to a method, devices and a system for automatic device failure recovery.

BACKGROUND OF THE INVENTION

A device, such as a device at a Central Office of an operator or a device of a user at home, when the device is in operation, may be managed by a management device in operation. The management device communicates with the device with a management protocol to manage and maintain the device. The management and maintenance of the device include software upgrading, failure diagnosing, and configuration management.

In general, a device in operation may also establish a connection with a server, and request downloading upgrading software, or request data configuration. Such a server may merely be a file storage server without any management function.

Figure 1:
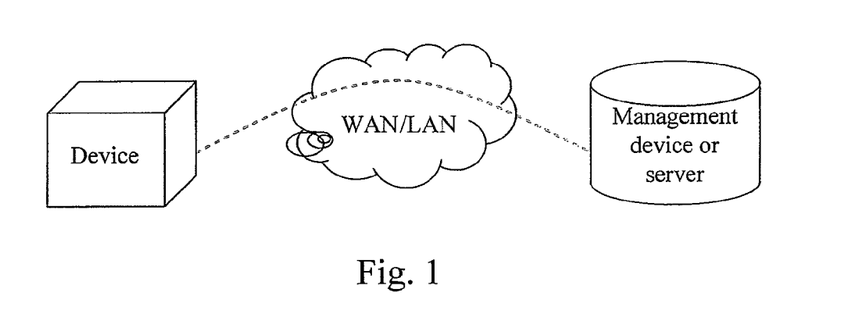
FIG. 1 is a schematic diagram illustrating the networking structure of a device and a management device or a server.

The connection between the device and the management device or between the device and a server is shown in FIG. 1. The device is directly connected to the management device or the server via a Wide Area Network or a Local Area Network. The device communicates with the management device or the server via a communication protocol.

All firmware or programs needed for operation by the device are stored in a memory, such as a FLASH memory. Data stored in the memory will not be lost when the memory is powered off. The firmware or a program includes a boot program (BOOTP) and application firmware or an application program. When the device is powered on or reset, the BOOTP solidified in the FLASH memory is first executed, and then an application program is executed.

To ensure the security of a device, the BOOTP of the device should not be changed by being software upgraded on line. However, application firmware or an application program may be upgraded on line in general. Therefore, the device is able to start with the BOOTP except that a hardware failure occurs in the device.

In practical application, when the firmware or the program of a device is upgraded by the management device, or the device requests a server for downloading the firmware or the program and upgrades with the firmware or the program, the device may not start normally using the newly-upgraded firmware or the program if an error occurs in a file transmission process or in an upgrade process. The error in the file transmission process may be caused by insufficient file checkout. The error in the upgrade processes may happen when writing the firmware or the programs into the FLASH memory of the device.

Besides the errors occur in the file transmission process or in the upgrade processes, the firmware or the program needed for operation by the device may also be damaged if there is a writing operation to the FLASH memory while the device is in operation. As a result, the device may not start normally.

Therefore, dual backups are generally adopted for the firmware or the program to be upgraded in a device to ensure a reliable startup of the device. When one copy of the dual backups is damaged, the device may operate with the other copy of the dual backups.

Since the dual backups of the programs occupy much space of the FLASH memory, the space of the FLASH memory is required to be large enough, which increases the cost of the hardware of the device.

For solving the problems mentioned above, another solution is adopted at present. The solution includes restoring the device with a local emergency restoration measurement when the device starts abnormally. For example, a WEB emergency page is popped up in the BOOTP of the device to request the user to re-upgrade the programs.

It is easy to find that the device is required to have the interface and means of local maintenance and management, and the emergency restoration of the device may not be fulfilled automatically without the cooperation of the user. Therefore, it is required that the user should know correlative techniques well, i.e. the restoration processing for a failure of the device may be implemented only if the user masters certain network knowledge. If the user may not carry out the corresponding restoration, an operator is required to offer an on-site maintenance service. Therefore, the maintenance cost increases greatly.

SUMMARY OF THE INVENTION

In view of the above problems in the conventional methods, embodiments of the present invention provide a method, devices and a system for automatic device failure recovery. If the device may not start due to a failure, the restoration processing for the failure may be implemented automatically. Therefore, a device may recover from a failure automatically by using the solution of the present invention.

The present invention provides a method for automatic device failure recovery. The method includes:

sending a recovery request message to a management device or a server;

obtaining a program file used for failure recovery from the management device or the server; and performing the failure recovery according to the program file.

Another embodiment of the present invention further provides a device for automatic device failure recovery. The device includes:

a failure recovery processing module, configured to send a recovery request message to a management device or a server;

obtain a program file used for failure recovery from the management device or the server; and perform the failure recovery by using the program file.

Another embodiment of the present invention provides a management device. The management device includes:

a device failure processing module, configured to receive a recovery request message, and send a program file used for failure recovery to a device.

Another embodiment of the present invention provides a system for automatically recovering a device from a failure. The system includes:

a failure recovery processing module, set in a device, configured to send out a recovery request message, obtain a program file used for a failure recovery, and perform the failure recovery according to the program file; and a device failure processing module, set in a management device or a server, configured to receive the recovery request message, and send the program file to the failure recovery processing module.

As can be seen from the above technical solutions provided by embodiments of the present invention, a device may recover from a failure automatically by using the embodiments of the present invention. A local user is not required to interfere in the whole failure recovery process. Therefore, the upgrade recovery may be implemented conveniently and neatly.

Meanwhile, the failure recovery processing is made safer and more reliable by implementing the automatic failure emergency recovery of a device provided by the present invention. Therefore, the cost of the local maintenance of a device is effectively reduced.

DETAILED DESCRIPTION OF THE INVENTION

In one aspect, it is required that a device recover from a failure by communicating with a management device or a server according to embodiments of the present invention. In another aspect, it is required that a device recover from a failure automatically without the intervention of a user according to embodiments of the present invention, which does not increase the cost of device hardware.

In embodiments of the present invention, if a device may not start due to the failure of a program file, the device communicates with a management device or a server to obtain a program file stored in the management device or the server and used for failure recovery. The device may recover from the failure by using the program file. Therefore, it is ensured that when a failure occurs in a device, the device may recover from the failure automatically with the embodiments of the present invention, which ensures that the device may start reliably.

Figure 2:
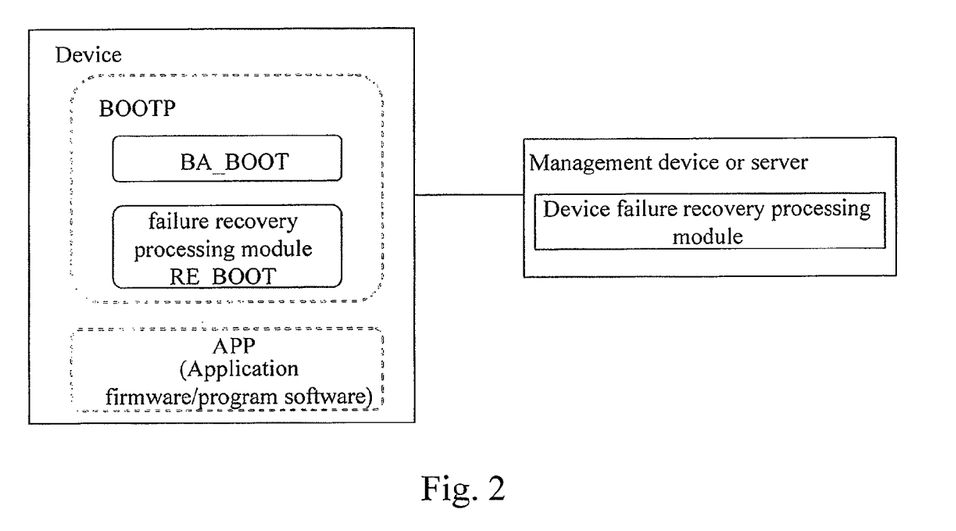
FIG. 2 is a schematic diagram illustrating the structure of a device and a system capable of automatically recovering from a failure according to an embodiment of the present invention.

In the embodiment of the present invention, the structure of the modules of management software set in a device which is managed is modified. The modified structure is shown in FIG. 2.

BA_BOOT is a basic BOOTP, i.e. the conventional BOOTP.

Failure recovery processing module (RE_BOOT) is a recovery BOOTP, which is a part newly-added and set in embodiments of the present invention. The RE_BOOT is a BOOTP used for failure recovery. The RE_BOOT is unable to be upgraded online and is used for establishing a connection with the management device or the server. The RE_BOOT interacts with the management device or the server adopting the corresponding communication protocol to automatically recover the programs of the device.

The APP which is a program file is conventional program software. The program file is application firmware or a program.

The structure of a system for a device automatically recovering from a failure provided by the embodiments of present invention is shown in FIG. 2. The system includes a failure recovery processing module and a device failure processing module.

The failure recovery processing module, set in a device, is configured to send a recovery request message to a management device or a server when the device may not start due to a program file failure, and obtain a program file used for failure recovery from the management device or the server. The failure recovery processing module further executes the obtained program file to recover the device from failure.

The device failure processing module, set in the management device or the server, is configured to receive the recovery request message sent form the device, and send the program file used for failure recovery to the device based on the recovery request message.

Methods of the embodiments of the present invention are described as follows. In a method provided by the embodiment of the present invention, the failure recovery processing module in the device initiates corresponding process when the device fails. The failure recovery processing module further communicates with the management device or the server to obtain the program file used for recovering the device from a failure and stored in the management device or the server, and implements the failure recovery adopting the obtained program file.

Figure 3:
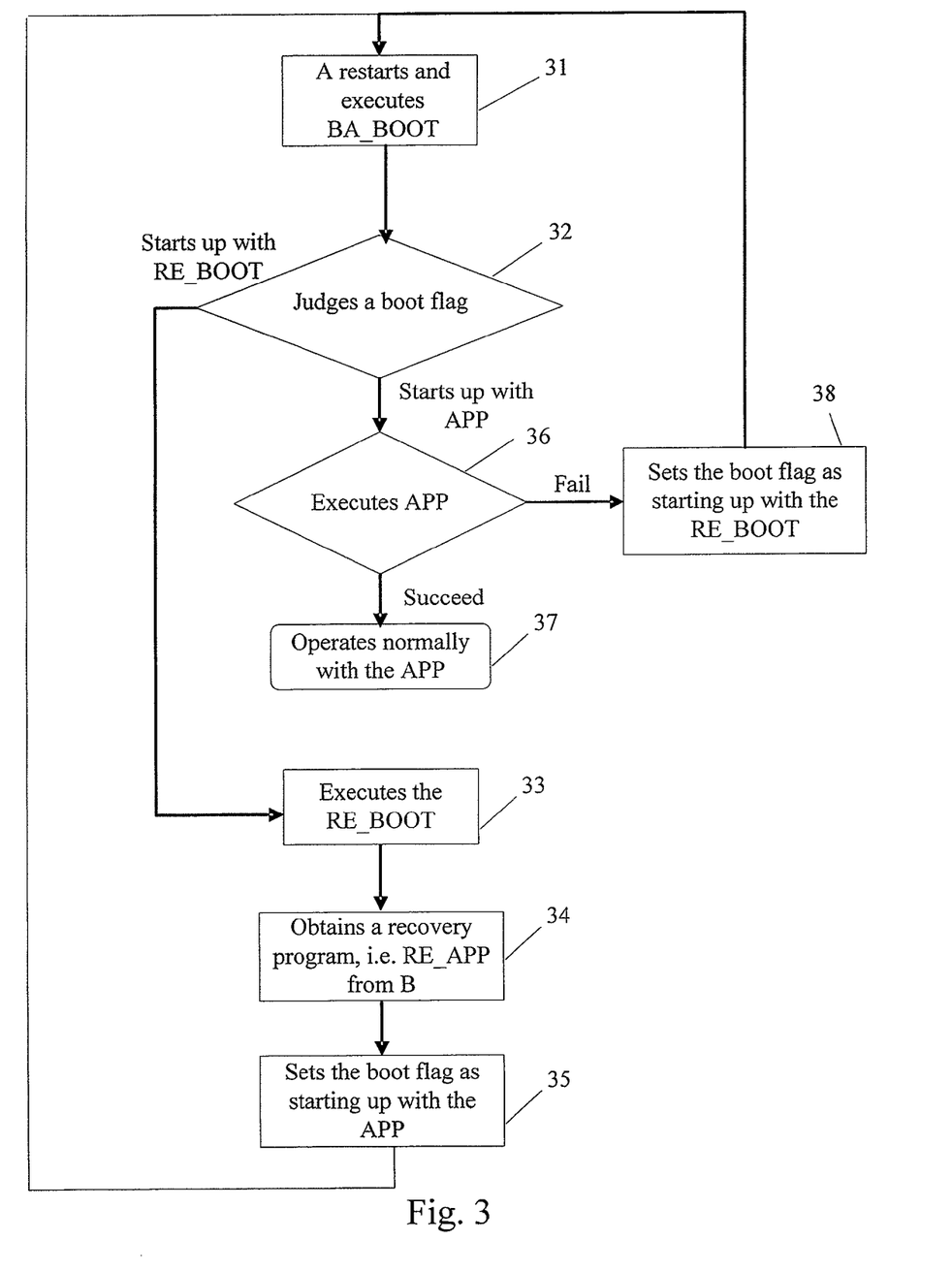
FIG. 3 is a schematic diagram illustrating the automatic failure recovery process of a device according to an embodiment of the present invention.
Figure 4:
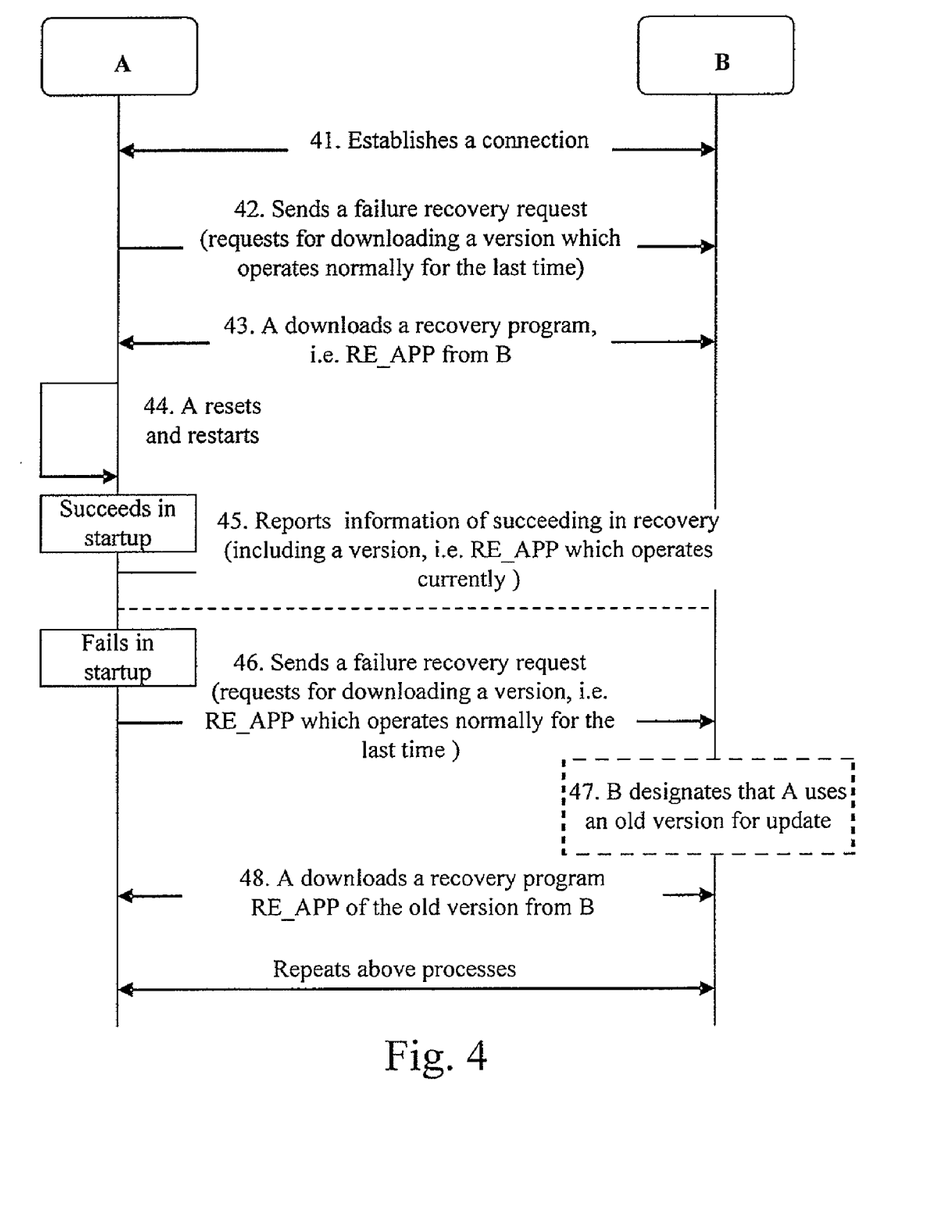
FIG. 4 is a schematic diagram illustrating the automatic failure recovery process between a device and a management device or a server according to an embodiment of the present invention.

To describe the method provided by the embodiment of the present invention, the processing of the method is described according to FIGS. 3 and 4. The processing includes the failure recovery processing in a device and the failure recovery processing of the communication between the device and a management device or a server.

As shown in FIG. 3, the internal processing of the device includes the following processes, when a device may not start normally with the APP due to a failure.

Block 31: A device is reset to restart with a BOOTP. The device executes the BA_BOOT first, i.e. the device starts by executing a basic BOOTP.

Block 32: The device judges whether to start normally with the APP or to start with the RE_BOOT by determining a boot flag in the BA_BOOT. If a failure occurs in the device, the device should start with RE_BOOT.

If the boot flag indicates that the device starts with the RE_BOOT, Block 33 is performed; otherwise, Block 36 is performed.

Block 33: The RE_BOOT is executed.

Block 34: The RE_BOOT connects with a management device or a server, and obtains a recovery program (RE_APP) from the management device or the server.

Block 35: After obtaining the RE_APP, the boot flag in the BA_BOOT is set as starting up with the RE_APP. And then, the device is restarted, i.e. Block 31 is performed. Therefore, the device is enabled to start normally by using the newly-obtained RE_APP, i.e. the failure recovery is implemented.

Block 36: The device judges the boot flag in the BA_BOOT after being reset, and executes the APP if the boot flag indicates that the device starts with the APP.

It is judged whether the device may start normally with the APP, i.e. whether the APP has been executed successfully. If the APP has been executed successfully, Block 37 is performed; otherwise, Block 38 is performed.

Block 37: The APP operates normally, and the failure recovery processing is terminated.

Block 38: If the APP may not operate normally, the boot flag in the BA_BOOT is set as starting up with the RE_BOOT and Block 31 is performed again.

When the device fails and may not start with the APP, the automatic recovery processing between a device and a management device or a server is shown in FIG. 4. In FIG. 4, A is the device, and B is the management device or the server. The procedure includes the following processes.

Process 41: A connects with B first, i.e. the device executes the RE_BOOT and establishes a corresponding connection.

Process 42: A sends a recovery request message, i.e. a failure recovery request message sent to B via the connection established. A carries the information of a version with which the device operated normally for the last time in the recovery request message to request downloading the APP of the version with which the device operated normally for the last time.

It is indicated in the process that a failure occurs in the device. The device requests the management device or the server for recovery, and preferentially downloads the APP of the version with which the device operated normally for the last time.

If the information of the version of the APP with which the device operated normally for the last time is not stored in the management device or the server, the newest version is requested by default.

Process 43: A downloads the program of a recovery version (RE_APP), i.e. a program file used for failure recovery, from a location designated by B.

Process 44: A restarts according to the obtained RE_APP, i.e. A starts with the RE_APP.

Process 45: If starting up successfully, A establishes a connection (a connection reestablished when downloading the RE_APP) with B, and notifies B of the information of succeeding in the recovery. The information includes the version executed currently. Meanwhile, A writes the information of the current version into the FLASH memory. Data stored in the FLASH memory will not be lost when A is powered off.

Process 46: If failing in starting up, A establishes a connection (i.e. the corresponding connection established when executing the RE_BOOT after the device is reset) with B, and continues to report a failure recovery request. A carries the information of the version with which A operated normally for the last time in the failure recovery request.

Process 47: B finds that A failed in failure recovery, and designates that A should use a version previous to the one with which A operated normally for the last time to recover from a failure. This process is performed to avoid downloading the same version all the while, because A may not recover normally with the same version.

Process 48: A downloads the recovery program of the previous version from B. And process 44 is performed again.

Embodiments of the present invention are further described according to the following application examples.

An embodiment of the present invention is described as follows taking an example of applying the solution in a Customer Premise Equipment (CPE). The CPE may communicate with an Auto-Configuration Server (ACS) with the CPE WAN Management Protocol (CWMP) or communicate with a PC running a management program through a Local Area Network (LAN) locally.

The CWMP is the CPE WAN Management Protocol TR-069 constituted by the Digital Subscriber Line (DSL) Forum Home Technical Working Group. The CWMP aims to standardize the communication between the CPE and the ACS. Main function supported by the CWMP includes automatic CPE configuration, dynamic service issuing, software or firmware upgrade management, state and performance monitoring and failure diagnosis.

The CPE WAN Management Protocol is mainly used for managing a broadband network terminal (B-NT), and is further used for managing CPEs of other types.

Figure 5:
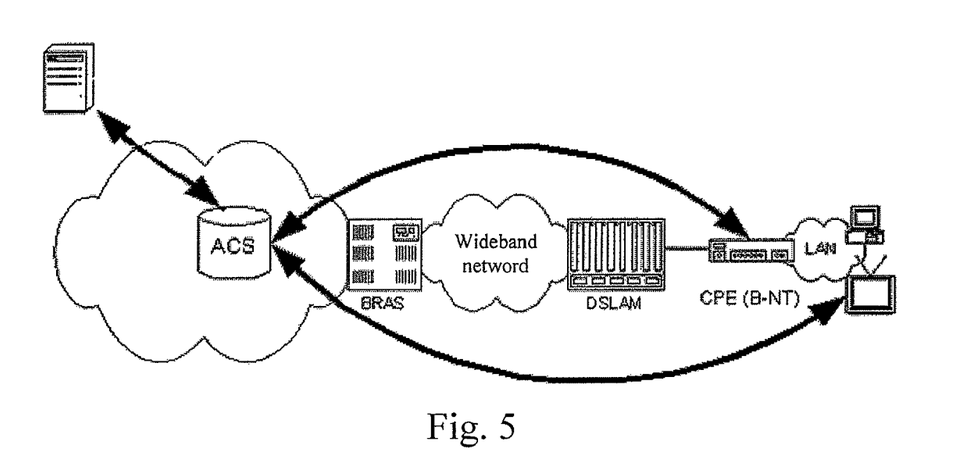
FIG. 5 is a schematic diagram illustrating the structure of a network including a Customer Premises Equipment (CPE).

The framework of automatic CPE configuration defined by the CPE WAN Management Protocol is shown in FIG. 5.

When a CPE communicates with a PC, i.e. a management device through the LAN, a configuration file configured by a service provider and a user may be transmitted to the CPE by management programs in the PC. The CPE receives the configuration file and establishes a WAN connection based on the configuration file.

Figure 6:
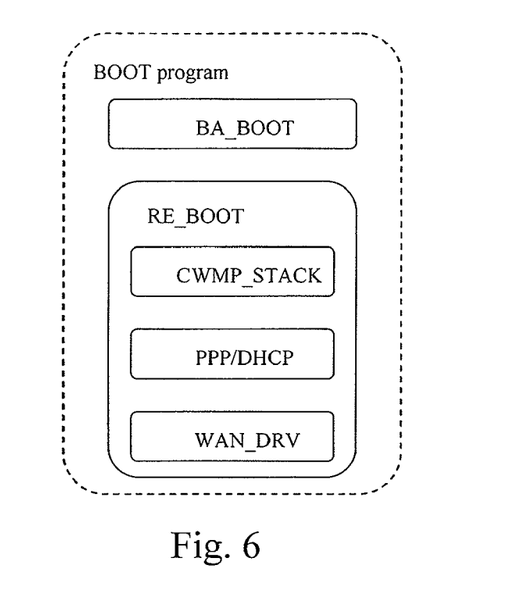
FIG. 6 is a schematic diagram illustrating the structure of BOOTP modules of a CPE.

In accordance with the solution of the present invention, the structure of the BOOTP of a CEP communicating with a management device or a server through a WAN or LAN is shown in FIG. 6. The BOOTP of the CEP includes the following parts:

BA_BOOT which is a conventional basic BOOTP;

RE_BOOT which is a newly-added module includes the CWMP Management Protocol stack, Point-to-Point Protocol (PPP) or Dynamic Host Configuration Protocol (DHCP) protocol stack, and a driver for an uplink WAN device.

Figure 7:
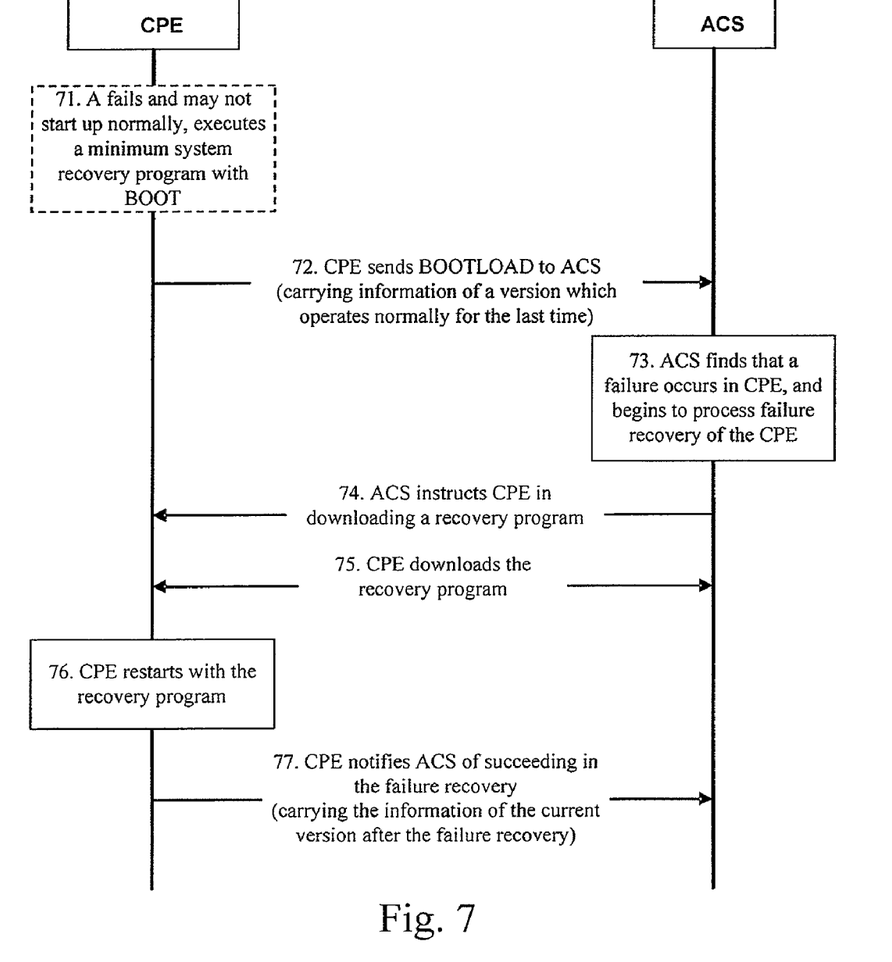
FIG. 7 is a simplified flow chart of a failure recovery processing procedure of a CPE.

When a CPE may not start with an application normally because of a failure, the startup procedure of the BOOTP is shown in FIG. 7. The startup procedure includes the following processes.

Process 71: When a CPE fails and may not start normally, the CPE executes a minimum system recovery program with the BOOT. The detailed processes are described as follows.

First: When the basic BOOTP of the CPE, i.e. the BA_BOOT is executed, the recovery BOOTP, i.e. the RE_BOOT is executed.

Second: The recovery BOOTP executes a WAN_DRV module first to initialize an uplink hardware device, i.e. to initialize the hardware used for communicating between the CPE and the network-side devices, which enables the CPE to establish a communication connection with an ACS.

Third: The recovery BOOTP reads a configuration file, i.e. the configuration file used by a CPE when the CPE operates normally, from the FLASH memory. If there is an error in the configuration file or the reading fails, a default configuration file of leave factory is adopted. The configuration file is obtained to acquire information required in the failure recovery processing, such as the addresses of the CPE and the ACS.

Fourth: The recovery BOOTP uses the PPP or DHCP protocol stack according to configuration data in the configuration file to acquire the IP address of the CPE and the address of the ACS. If the recovery BOOTP fails in obtaining the address of the ACS, the address of the ACS may be obtained from the configuration file.

Fifth: The recovery BOOTP executes the CWMP protocol stack.

Process 72: The CPE establishes an initial connection with the ACS, and transmits an Inform message to the ACS. An event code, i.e. BOOTLOAD is carried in the Inform message.

A version of device software in the parameter list of the Inform message is the version with which the CPE operated normally for the last time. If there is a failure in reading the number of the version, the version of the device software is empty.

Process 73: The ACS receives the event code, i.e. BOOT-LOAD of the CPE, and recognizes that a failure occurs in the BOOT of the CPE and the CPE requests for loading a failure recovery program. The ACS executes failure recovery processing for the CPE and records the failure event log of the CPE.

Process 74: The ACS calls a downloading (Download) method of the CPE according to the number of software version reported by the CPE in the BOOTLOAD to instruct the CPE in downloading the failure recovery program. Corresponding version information of the failure recovery program is carried in the Inform message.

The version reported by the CPE is downloaded by default, because the CPE may operate normally with the version before.

The ACS designates by default that the CPE should use the newest version for upgrade if the number of software version reported by the CPE is empty.

In addition, the version of the failure recovery program loaded by CPE may also be customized by an administrator.

Process 75: The CPE downloads the failure recovery program designated by the ACS by communicating with the ACS to perform failure recovery processing.

Process 76: After obtaining the corresponding failure recovery program, the CPE restarts and executes programs with the failure recovery program.

Process 77: After succeeding in recovery, the CPE reports the information of the recovery including the information of the current version (i.e. the version used for recovery) to the ACS according to a normal procedure. The CPE further records the version number of the software operated normally at present into the FLASH memory of the device, so that the software may be used for recovery next time.

If the CPE fails in the recovery, the above corresponding processes are performed again. The ACS is required to record a portion of the information of historical versions of the CPE. When the ACS does not receive a report indicating that the CPE has succeeded in recovery, but receive a BOOTLOAD request sent from the CPE, the ACS needs to designate that the CPE should recover from a failure with a program file with which the CPE operated normally for the last time, and transmits the program file to the CPE. The CPE may perform failure recovery with the program file.

Figure 8:
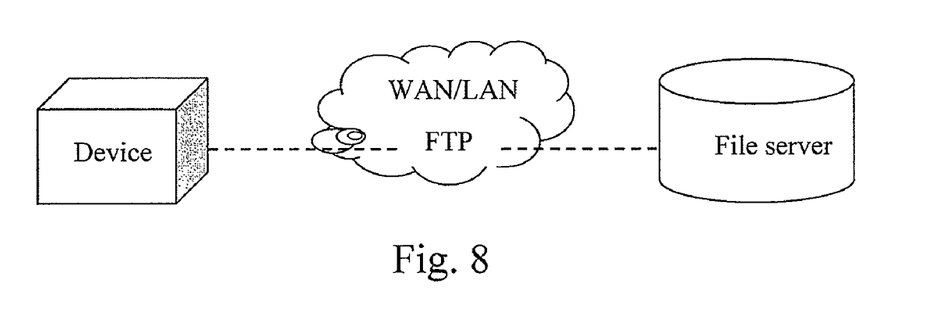
FIG. 8 is a schematic diagram illustrating the connection which is on the basis of the File Transfer Protocol (FTP) between a device and a file server.

An embodiment of applying the solution of the present invention in an ordinary device is described as follows. The device communicates with another device adopting the File Transmission Protocol (FTP). As shown in FIG. 8, a device communicates with an ordinary file server via the WAN or LAN to obtain corresponding program files. Information of versions of the device and the program files of specific versions are stored in the file server. The program files of specific versions include the program files of historical versions.

Figure 9:
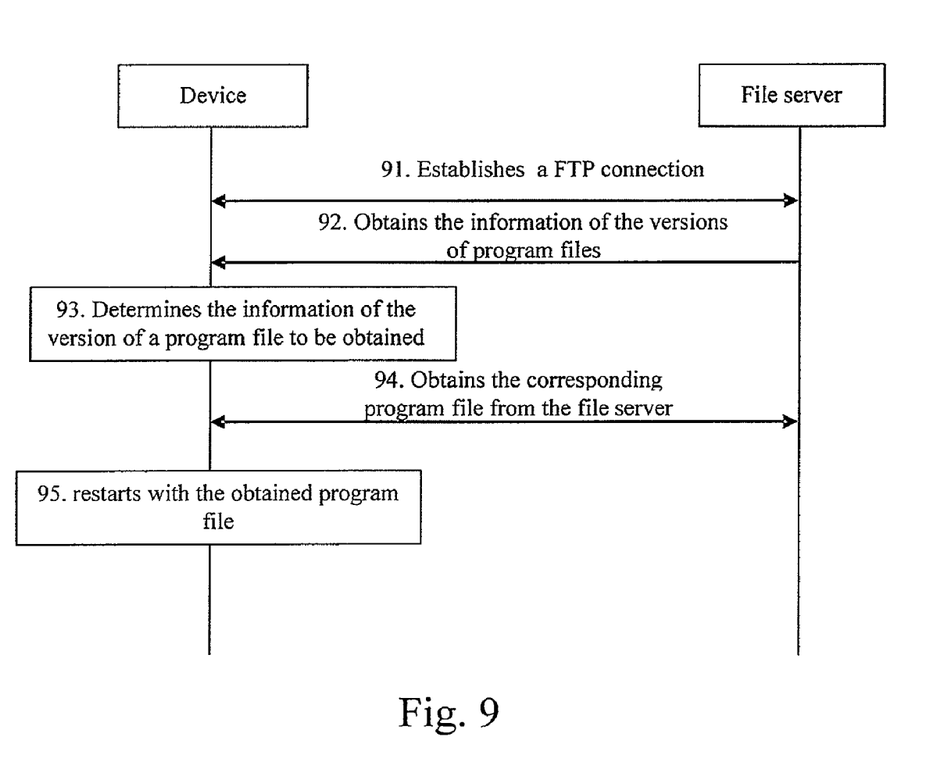
FIG. 9 is a simplified flow chart of a failure recovery processing procedure of a device in FIG. 8.

Recovery BOOTP of the device includes FTP protocol stack. After a failure occurs in the device and the device executes the recovery BOOTP, the corresponding processing is shown in FIG. 9. The processing includes the following processes.

Process 91: A device establishes an FTP connection with the file server first.

Process 92: The device obtains information of versions of program files corresponding to the device from the file server.

Process 93: The device judges the information of the version of a program file to be acquired according to the information of versions operating normally stored by the device itself and the information of versions of the program files corresponding to the device, after obtaining the information of versions of the program files corresponding to the device.

It is judged whether the information of the versions saved in the file server includes the information of the version with which the device operated normally for the last time. If the information of the version with which the device operated normally for the last time is saved by the file server, the device prepares for downloading the program file of the version with which the device operated normally for the last time; otherwise, the device prepares for downloading the program file of the previous version from the file server.

Process 94: After determining the information of the version of the program file that the device needs to acquire, the device downloads the program file of the corresponding version needed in the failure recovery processing from the filer server.

Process 95: The device restarts and executes the downloaded program file for failure recovery, i.e. the device restarts by using the acquired program file to implement the failure recovery processing.

If the device may not start normally, i.e. the failure recovery fails, in the above processes, the above processes are performed again to request a program file of the previous historical version to perform failure recovery processing till the failure recovery succeeds or fails eventually.

To sum up, with the embodiments of the present invention, the failure emergency recovery of a device becomes safer and more reliable, and does not require the intervention of a local user, which means that the failure recovery is implemented fully automatically. Therefore, the cost of local maintenance of a device is reduced effectively.

The foregoing are merely preferred embodiments of the present invention. The protection scope of the present invention, however, is not limited to the above description. Any change or substitution, within the technical scope disclosed by the present invention, easily occurring to those skilled in the art should be covered by the protection scope of the present invention. Therefore, the protection scope of the present invention should be according to the claims.

The invention claimed is:

1. A method for automatic device failure recovery, comprising:
obtaining, by a device, after a failure occurs in the device, information associated with a plurality of versions of recovery program files corresponding to the device from a server;
determining, by the device, whether the information associated with the plurality of versions of the recovery program files obtained from the server includes information associated with a version of a program file with which the device last operated normally by comparing information associated with a plurality of versions of the program file with which the device operated normally stored by the device itself with the information associated with the plurality of versions of the recovery program files corresponding to the device obtained from the server;
if the information associated with the plurality of versions of the recovery program files obtained from the server includes information associated with the version of the program file with which the device last operated normally, downloading, by the device, the version of the program file with which the device last operated normally from the server;

otherwise, downloading, by the device, a previous version of the program file with which the device operated normally from the server; and performing, by the device, failure recovery using the downloaded version of the program file.

2. The method of claim 1, further comprising:

establishing, by the device, a connection with the server if the device is not able to restart due to a failure of a recovery program file.

3. The method of claim 1, wherein the information associated with the plurality of versions of recovery program files comprises software version information.

4. An apparatus for automatic device failure recovery, comprising:

an automatic device failure recovery processing unit configured to:

obtain, after a failure occurs in a device, information associated with a plurality of versions of recovery program files corresponding to the device from a server;

determine whether the information associated with the plurality of versions of the recovery program files obtained from the server includes information associated with a version of a program file with which the device last operated normally by comparing information associated with a plurality of versions of the program file with which the device operated normally stored by the device itself with the information associated with the plurality of versions of the recovery program files corresponding to the device obtained from the server;

if the information associated with the plurality of versions of the recovery program files obtained from the server includes information associated with the version of the program file with which the device last operated normally, download the version of the program file with which the device last operated normally from the server;

otherwise, download a previous version of the program file with which the device operated normally from the server; and perform failure recovery using the downloaded version of the program file.

* * * * *